US006333839B1

(12) United States Patent
Misso et al.

(10) Patent No.: US 6,333,839 B1
(45) Date of Patent: Dec. 25, 2001

(54) TOLERANCE RING WITH LOW CONSISTENT INSTALLATION FORCE PROFILE

(75) Inventors: Nigel F. Misso, Bethany; Denis A. Seewald, Mustang; Inman L. Jones, Yukon, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/690,794

(22) Filed: Oct. 17, 2000

Related U.S. Application Data (60) Provisional application No. 60/169,022, filed on Dec. 3, 1999.

(51) Int. Cl.[7] .................................................. G11B 21/08
(52) U.S. Cl. ............................................................ 360/265.7
(58) Field of Search ..................................... 403/365, 371, 403/372; 360/264.3, 265.2, 265.6; 384/535, 581

(56) References Cited

U.S. PATENT DOCUMENTS

| | | | | |
|---|---|---|---|---|
| 3,776,653 | * | 12/1973 | Buzogany | 403/372 |
| 5,539,597 | * | 7/1996 | Blanks | 360/98.06 |
| 5,548,458 | * | 8/1996 | Pelstring et al. | 360/99.08 |
| 5,914,837 | | 6/1999 | Edwards et al. | 360/265.6 |
| 5,983,485 | * | 11/1999 | Misso | 29/603.03 |
| 6,163,441 | * | 12/2000 | Wood et al. | 360/266.1 |

* cited by examiner

Primary Examiner—David Davis
(74) Attorney, Agent, or Firm—Crowe & Dunlevy (57) ABSTRACT

A tolerance ring which provides a low consistent installation force profile as a rotatable member, such as a disc drive actuator, is installed onto a stationary member, such as a shaft extending along an axis. The tolerance ring has a substantially cylindrical base portion from which a plurality of spaced apart raised portions radially extend. Each raised portion has a contact surface with a substantially elliptical cross-sectional shape in a direction parallel to the axis and a pair of transition portions between the contact surface and the base portion. Each transition portion further has a continually radiused cross-sectional shape in a direction parallel to the axis so that, for each raised portion, a selected one of the elliptical cross-sectional shapes and the pair of radiused cross-sectional shapes is convex with respect to the axis and the remaining one of the elliptical cross-sectional shapes and the pair of radiused cross-sectional shapes is concave with respect to the axis.

13 Claims, 7 Drawing Sheets

TOLERANCE RING WITH LOW CONSISTENT INSTALLATION FORCE PROFILE

RELATED APPLICATIONS

This application claims the benefit of U.S. Provisional Application No. 60/169,022 filed Dec. 3, 1999.

FIELD OF THE INVENTION

This invention relates generally to the field of disc drive storage devices, and more particularly, but not by way of limitation, to a tolerance ring that provides a low, consistent installation force profile.

BACKGROUND OF THE INVENTION

Modern hard disc drives comprise a mechanical housing which encloses one or more rigid discs that are rotated at a constant high speed. Data are stored on the discs in a plurality of concentric circular tracks by an array of transducers ("heads") mounted to a radial actuator for movement of the heads relative to the discs.

The heads are mounted via flexures at the end of a plurality of arms that project radially outward from an actuator body. The actuator body pivots about a pivot shaft, such as a vertical post which extends upwardly from the housing. The post is parallel with the axis of rotation of the discs so that the heads move in a plane parallel with the surface of the discs.

Typically, such radial actuators employ a voice coil motor to position the heads with respect to the disc surfaces. The voice coil motor includes a magnetic circuit mounted to the disc drive housing and a coil mounted on the side of the actuator body opposite the head arms so as to be immersed in the magnetic field of the magnetic circuit. When controlled current is passed through the coil, an electromagnetic field is set up which interacts with the magnetic field of the magnetic circuit to cause the coil to move in accordance with the well-known Lorentz relationship. As the coil moves, the actuator body pivots about the post and the heads move across the disc surfaces.

In the manufacturing of a disc drive, it is important that the actuator assembly be placed in the proper location, centered on all three axes, longitudinal, latitudinal, and translational (x, y, and z) with respect to the discs. Typically, the actuator assembly has a large bored recess which accommodates a cartridge bearing assembly with a pair of ball bearing assemblies to accommodate rotation of the actuator assembly about the z-axis. The cartridge bearing assembly includes an inner bored recess to allow the actuator assembly to fit over the post. The diameters of the large bored recess and the inner recess are maintained within predetermined, close tolerance ranges.

A tolerance ring can be advantageously used to compensate for variances of the manufacturing tolerances and thus contribute to the proper positioning of the actuator assembly in all three axes. Exemplary prior art tolerance ring configurations are disclosed in U.S. Pat. No. 5,315,465 issued to Blanks, U.S. Pat. No. 4,286,894 issued to Rongley, and U.S. Pat. No. 3,838,928 issued to Blaurock et al.

As will be recognized, the continuing trend in the industry is to provide ever increasing consistency in the manufacturing of disc drives in order to promote higher performance levels in the resulting drives. However, current tolerance rings are so designed that the amount of insertion (installation) force required to overcome the compression force of the ring varies widely during the course of installation on a single drive. Such installation force ranges, or profiles, can also vary widely from drive to drive due to the range of acceptable manufacturing tolerances necessary to facilitate large scale manufacturing environments. For example, where the inner recess in a cartridge bearing assembly is at the high end of the tolerance range (i.e., having the largest allowable circumference), relatively lesser amounts of force are required to place the actuator assembly on the post as compared to a bored recess at the low end of the tolerance range.

With continued demand for improved consistency in the installation of actuator assemblies, there remains a continuing need for improvements in disc drive assembly to provide consistent low installation force of the actuator assembly. It is to such improvements that the present invention is directed.

SUMMARY OF THE INVENTION

The present invention is directed to a tolerance ring that provides a low consistent installation force profile.

As exemplified by preferred embodiments, a disc drive includes a basedeck which supports an upwardly extending shaft, such as a post, which defines an actuator pivot axis. A tolerance ring with a novel mechanical configuration is placed on the post so as to circumferentially extend about an outer surface of the post. An actuator assembly with an inner bored recess is thereafter placed onto the post so that the tolerance ring is compressed between the surface of the inner bored recess and the outer surface of the post, thereby achieving and maintaining a desired nominal centering of the actuator assembly about the actuator pivot axis.

The mechanical configuration of the tolerance ring is selected to provide a low, consistent installation force profile and includes a substantially cylindrical base portion from which a plurality of spaced apart raised portions (corrugations) project. Each raised portion has a contact surface with a substantially elliptical cross-section in a direction parallel to the axis and a pair of transition portions between the contact surface and the base portion each having a continually radiused cross-section in a direction parallel to the axis. For each raised portion, a selected one of the elliptical cross-sections and the pair of radiused cross-sections is convex with respect to the axis and the remaining one of the elliptical cross-sections and the pair of radiused cross-sections is concave with respect to the axis.

This novel configuration provides a more consistent and controlled deformation of the tolerance ring during installation, enhancing manufacturability in high volume automated production environments, as well as potentially allowing the relaxing of specified tolerance ranges for the associated mechanical components.

Various other advantages and features of the present invention will be apparent from the following detailed description when read in conjunction with the drawings and appended claims.

BRIEF DESCRIPTION OF THE DRAWINGS

FIG. 10 is a graph comparing the respective installation force profiles of the prior art tolerance ring of FIG. 4 and the tolerance ring of FIG. 7.

DETAILED DESCRIPTION

Figure 1:
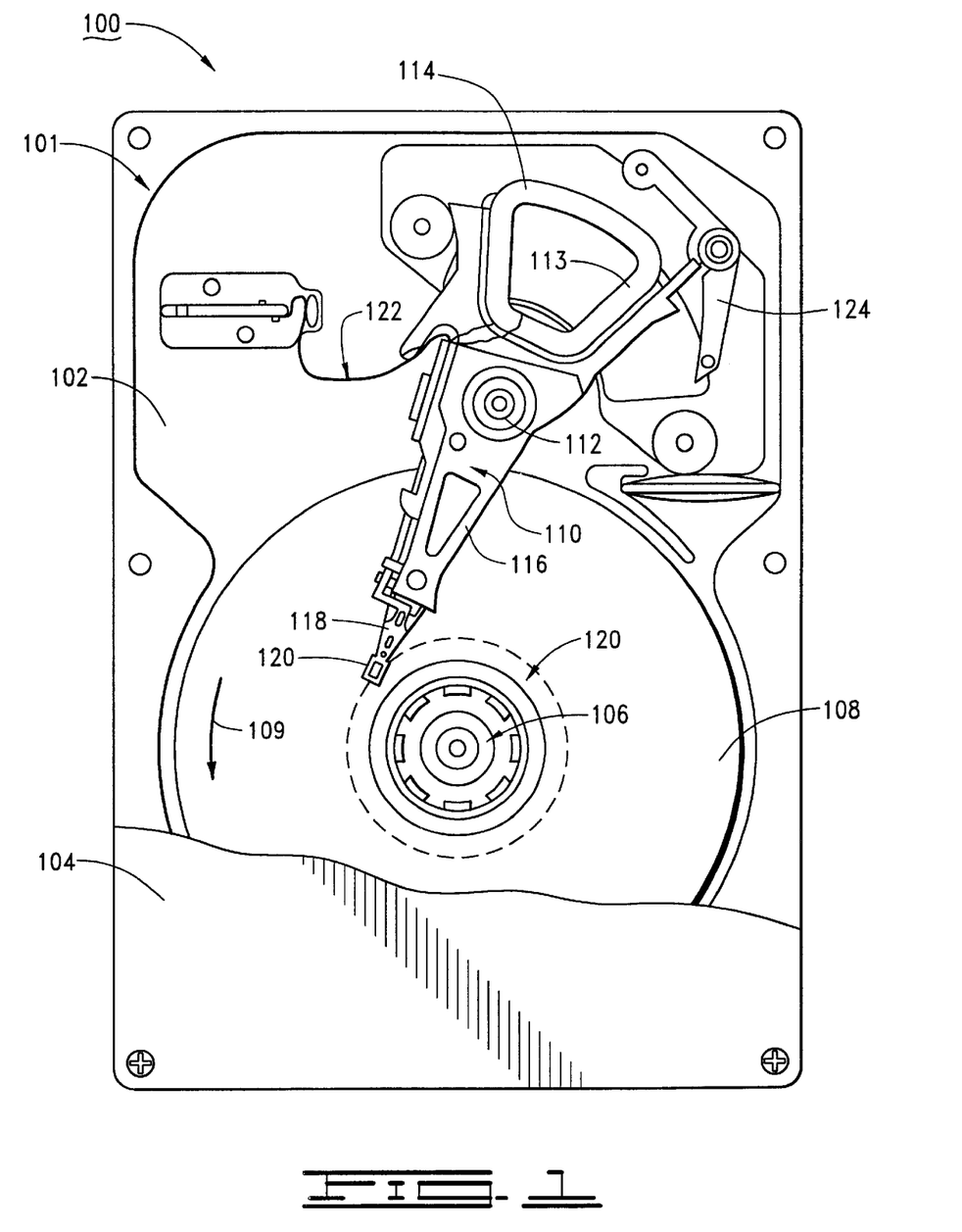
FIG. 1 is a top plan view of a disc drive incorporating a tolerance ring constructed in accordance with preferred embodiments of the present invention.

A detailed description of preferred embodiments of the present invention will commence with reference to FIG. 1, which shows a disc drive 100 used to store computer data. The disc drive 100 includes a head-disc assembly (HDA) 101 and a printed wire assembly (PWA) which is mounted to the underside of the HDA 101. Although not visible in FIG. 1, it will be understood that the PWA is used to control operation of the HDA 101.

A top cover (shown in partial cutaway at 104) mates with a basedeck 102 to provide an environmentally controlled environment for the HDA 101. A spindle motor (generally designated at 106) is supported by the basedeck 102 and rotates a plurality of axially aligned discs 108 at a constant high speed in an angular direction 109.

The discs 108 include recording surfaces (not separately identified in FIG. 1) to which user data are written by way of a rotary actuator assembly 110. The actuator assembly 110 incorporates a centrally disposed cartridge bearing assembly 112 to facilitate rotation of the actuator assembly 110 about an actuator pivot axis. The actuator assembly 110 further includes a coil 113 of a voice coil motor (VCM) 114. Angular position of the actuator assembly 110 is controlled through the application of current to the coil 113. As discussed below, a tolerance ring in accordance with preferred embodiments of the present invention is advantageously used to locate the actuator assembly 110 with respect to the basedeck 102.

The actuator 110 further includes rigid arms 116 from which a plurality of flexible suspension assemblies 118 extend. Each suspension assembly 118 in turn supports a head 120 over one of the respective recording surfaces of the discs 106. A flex circuit assembly 122 facilitates electrical interconnection between the actuator 110 and the disc drive PWA. A latch 124 secures the actuator 110 when the disc drive 100 is deactivated, allowing the heads 120 to safely come to rest upon landing zones (not separately identified) located at the innermost radii of the discs 106.

Figure 2:
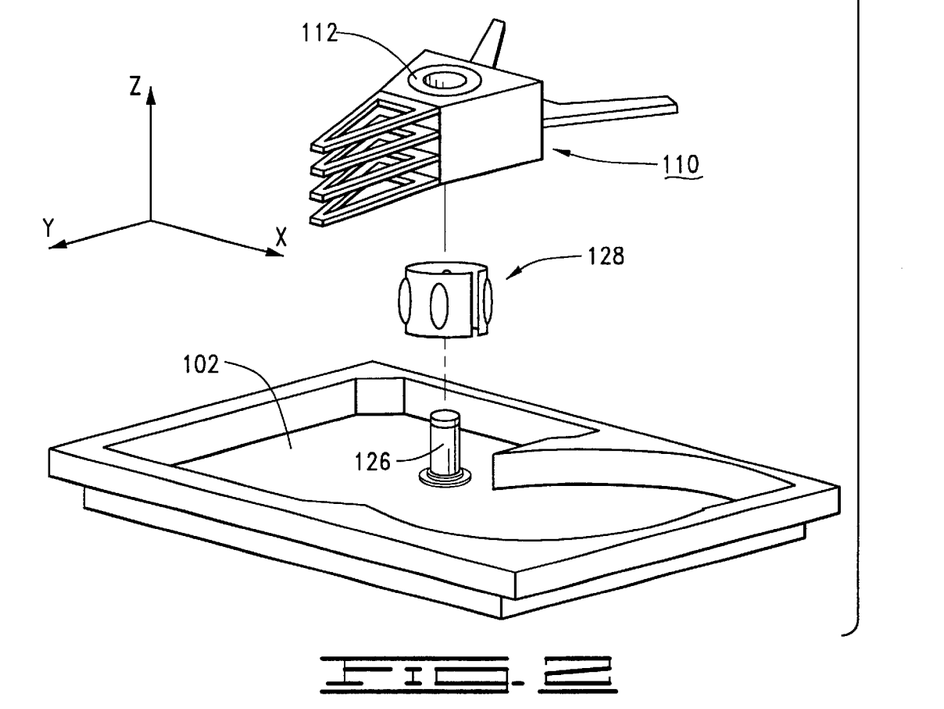
FIG. 2 is an exploded view of relevant portions of FIG. 1 and generally illustrates the manner in which the tolerance ring advantageously facilitates installation of the actuator assembly into the disc drive.

FIG. 2 generally illustrates a preferred manner in which the actuator assembly 110 is mounted in the disc drive 100. For clarity of illustration, various previously listed elements of the disc drive 100 from FIG. 1 have been omitted in FIG. 2.

As shown in FIG. 2, a post 126 extends from the basedeck 102 to define an actuator pivot axis (in the z-axis direction) about which the actuator assembly rotates. During assembly, a tolerance ring 128 is placed around the outer surface of the post 126 and the actuator assembly 110 is then inserted over the post 126. Compression of the tolerance ring 128 between the post 126 and the cartridge bearing assembly 112 serves to maintain the actuator assembly 110 in a desired relation to the actuator pivot axis, thereby facilitating precise placement of the heads 120 with respect to the discs 106 during subsequent operation.

Figure 3:
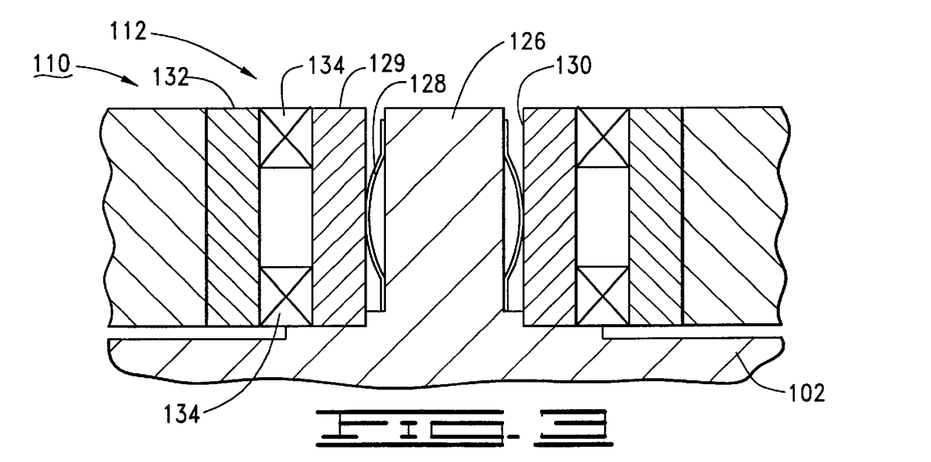
FIG. 3 is a cross-sectional view of the actuator assembly and tolerance ring of FIGS. 1 and 2 along a selected axis of rotation.

FIG. 3 provides a cross-sectional view of the actuator assembly 110 after installation onto the post 126. As shown by FIG. 3, the cartridge bearing assembly 112 comprises an inner sleeve 129 (with inner bored recess 130), an outer sleeve 132, and a pair of bearing assemblies 134 disposed therebetween. The tolerance ring 128 pressingly engages the inner bored recess 130 and the outer surface (not designated) of the post 126. While the embodiment of FIG. 3 shows a press-fit between the outer sleeve 132 and the actuator assembly 110, in an alternative embodiment, a second tolerance ring (nominally similar to the tolerance ring 128, but having a corresponding larger circumference) can be provided between the outer sleeve 132 and the actuator assembly 110, as desired.

Figure 4:
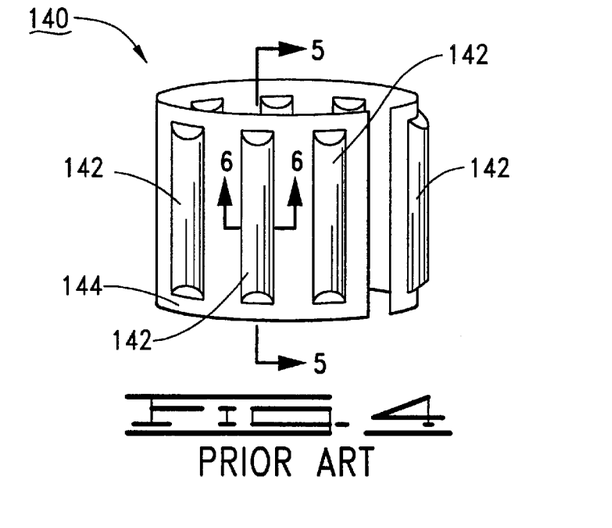
FIG. 4 is an isometric view of a prior art tolerance ring design.

For purposes of illustrating various operational advantages of the tolerance ring of the present invention, FIG. 4 has been provided to show an exemplary tolerance ring 140 formed in accordance with the prior art. As will be noted from FIG. 4, the tolerance ring 140 is formed from a nominally planar piece of material that is curved to be fitted around a post (or other cylindrical member). The tolerance ring 140 includes raised portions 142 (also referred to as "corrugations") which are evenly spaced around and which project from a substantially cylindrical base portion 144. The raised portions 142 are shown in FIG. 4 to project radially outwardly in a direction away from the interior of the tolerance ring 140. However, it will be recognized that alternative configurations known in the art include tolerance rings with raised surfaces that project inwardly, as well as raised surfaces that successively project inwardly and outwardly in an alternating fashion.

Figure 5:
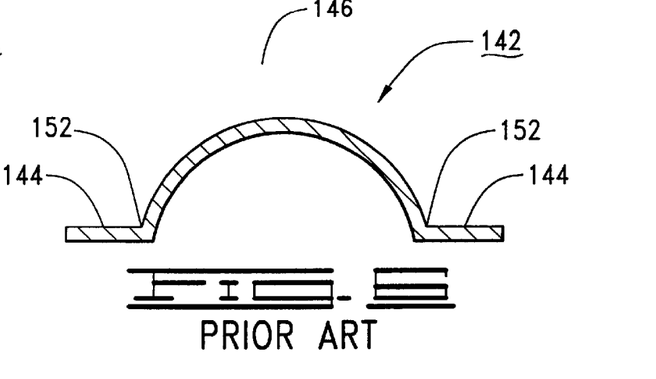
FIG. 5 is a cross-sectional view of the prior art tolerance ring of FIG. 4 along line 5—5 in FIG. 4.

Each raised portion 142 of the prior art tolerance ring 140 has a generally rhomboidal cross-sectional shape extending lengthwise, as shown in FIG. 5 which represents the view along line 5—5 in FIG. 4. More particularly, the raised portion 142 of FIG. 5 includes a contact surface 146 which maintains direct contact with the object fitted around the tolerance ring 140, and angled portions 148 ("side extenders") between the contact surface 146 and the base portion 144. It will be noted that the side extenders 148 merge into the outer surface 144 in a discontinuous fashion at sharply defined intersections 150 (also referred to as "discontinuous transitions").

Figure 6:
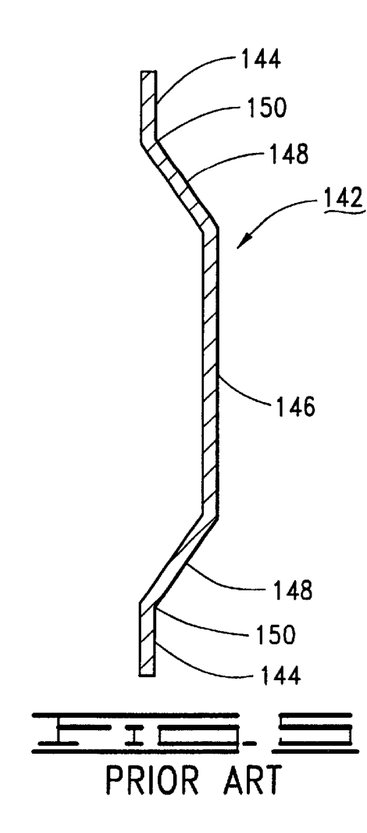
FIG. 6 is a cross-sectional view of the prior art tolerance ring of FIG. 4 along line 6—6 in FIG. 4.

FIG. 6 provides a cross-sectional view of the raised portion 142 along line 6—6 in FIG. 4. In FIG. 6, the contact surface 146 (also shown in FIG. 5) is semicircular in shape and merges with the base portion 144 at intersections 152.

Figure 7:
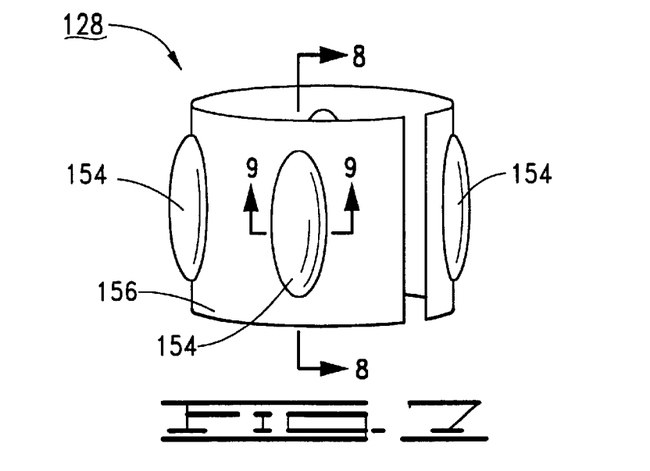
FIG. 7 is an isometric view of a tolerance ring constructed in accordance with a preferred embodiment of the present invention.

By contrast, FIG. 7 illustrates the tolerance ring 128 of FIGS. 1–3 in accordance with the present invention. As with the prior art tolerance ring 140, the tolerance ring 128 is also formed from a nominally planar piece of material of specific length curved about a predetermined radius (in this case, sufficient to fit about the post 126).

The tolerance ring 128 has a plurality of spaced apart raised portions 154 ("corrugations") which project from a base portion 156. Each raised portion 154 is shown to be generally elliptical in shape, with a major axis of the ellipse extending in a direction parallel to the actuator pivot axis when the tolerance ring 128 is placed onto the post 126 (see FIGS. 2 and 3), so that the major axis lies along the direction of insertion. While the tolerance ring 128 in FIG. 7 has been shown to incorporate a total of four raised portions 154, other numbers of raised portions are readily contemplated.

Figure 8:
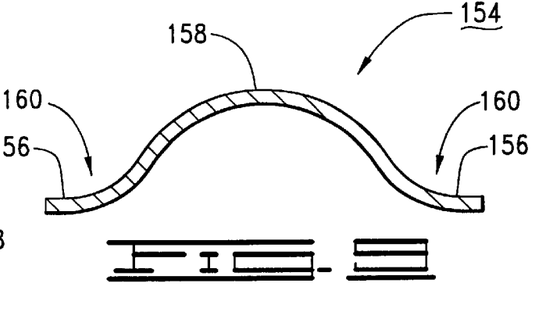
FIG. 8 is a cross-sectional view of the tolerance ring of FIG. 7 along line 8—8 in FIG.7.
Figure 9:
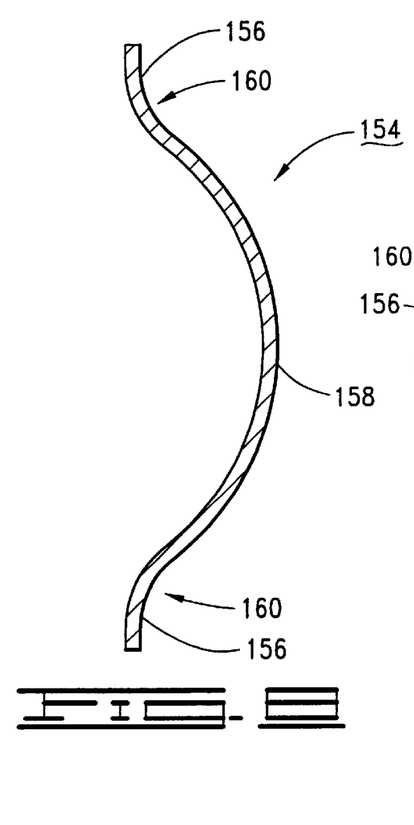
FIG. 9 is a cross-sectional view of the tolerance ring of FIG. 7 along line 9—9 in FIG. 7.

FIG. 8 provides a cross-sectional view along the major axis of the raised portion 154 as generally viewed along the line 8—8 in FIG. 7, and FIG. 9 provides a cross-sectional view along the minor axis of the raised portion 154 (along line 9—9 in FIG. 7). From FIGS. 8 and 9 it can be seen that each raised portion 154 includes a contact surface 158 at the apex thereof which engages the mating surface (such as surface 130 in FIG. 3). Each raised portion 154 further includes a transition portion 160 having a radiused cross-sectional shape, which provides a continuous transition from the elliptically shaped contact surface 158 and the base portion 156. The transition portion 160 preferably extends fully about the contact surface 158, but at least preferably extends at points along the major axis of the raised portion 154 (i.e., along the direction of insertion).

The raised portions are shown in FIG. 7 to project outwardly from the axis of the tolerance ring 128. From the view of FIG. 8 the contact surface 158 can be described as being "concave" with respect to the axis of the tolerance ring 128 and the adjoining transition portions 160 can be described as being "convex" with respect to the axis of the tolerance ring 128. It will be understood that alternative embodiments include raised portions 154 that project inwardly as well as raised portions 154 that project inwardly and outwardly in alternating fashion. Accordingly, an inwardly projecting contact surface 158 would have a convex shape and the transition portions 160 would each have a concave shape.

FIG. 10 provides a graphical comparison of typical installation force profiles encountered when installing a member (such as the actuator assembly 110) over the prior art tolerance ring 140 (FIGS. 4–6), and over the tolerance ring 128 of the present invention (FIGS. 7–9). The installation profiles are plotted against an x-axis 162 indicative of installation distance and a y-axis 164 indicative of installation force.

Figure 11:
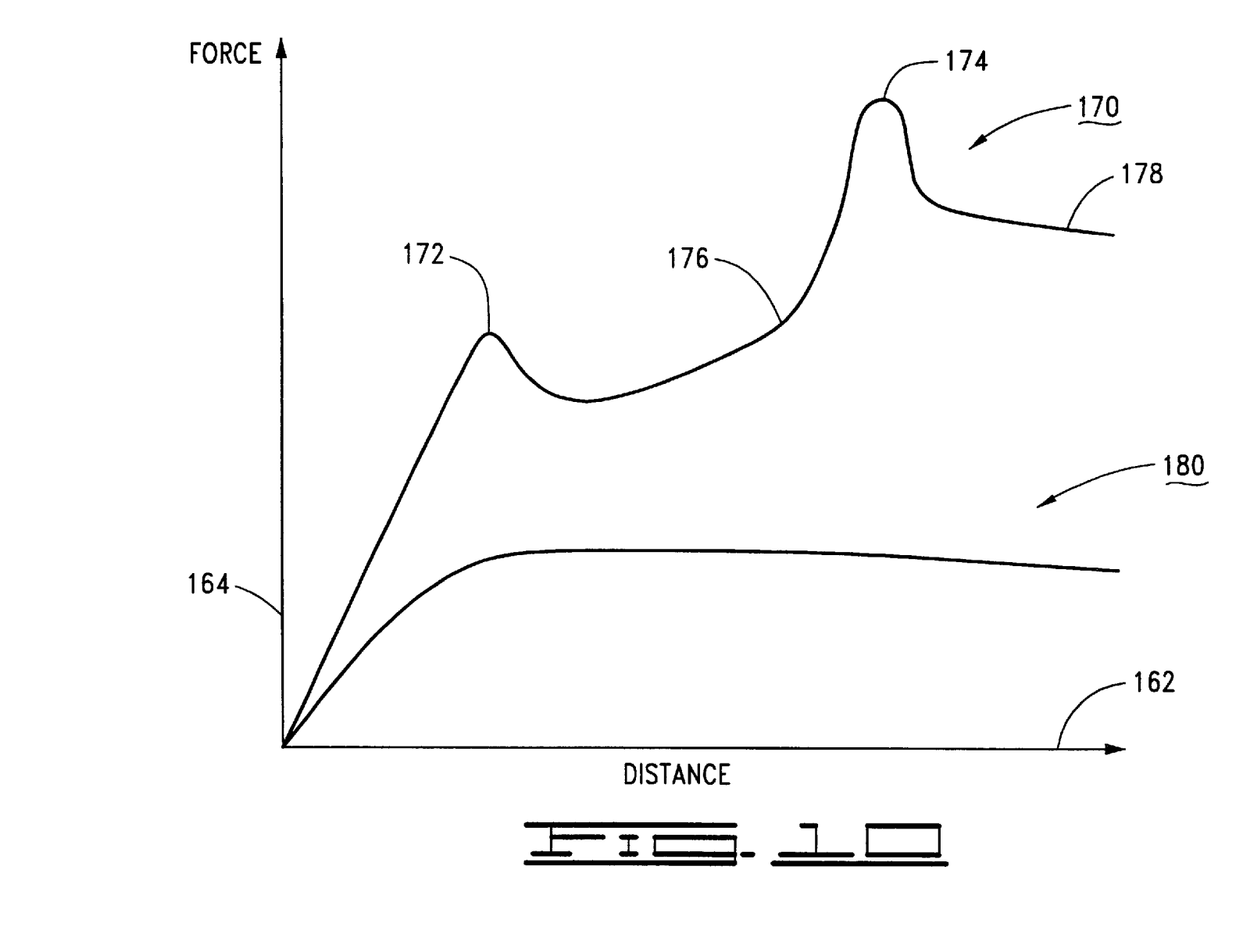
FIG. 11 is a cross-sectional view of the tolerance ring of FIG. 4 along lines 5—5 in FIG. 4 showing several stages of the installation of a cartridge bearing assembly over the post and the tolerance ring.
Figure 12:
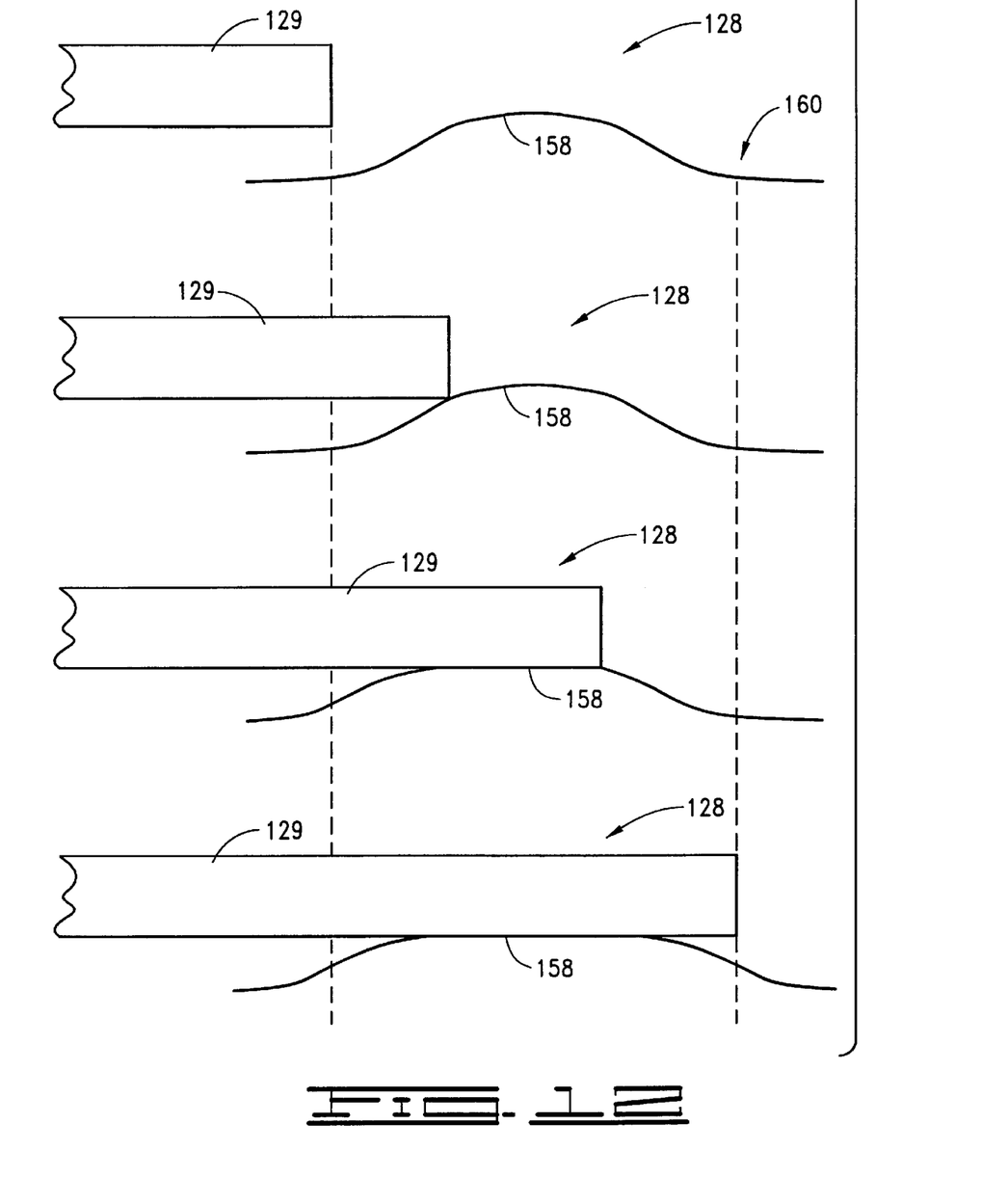
FIG. 12 is a cross-sectional view of the tolerance ring of FIG. 7 along lines 8—8 in FIG. 7 showing several stages of the installation of a cartridge bearing assembly over the post and tolerance ring.

A first profile curve 170 represents the installation force curve for the prior art tolerance ring 144, and a second profile curve 180 represents the installation force curve for the tolerance ring 128 of the present invention. FIGS. 11 and 12 provide schematic cross-sectional representations of the respective tolerance rings 140, 128 (generally corresponding to the orientations previously illustrated in FIGS. 5 and 8) during installation. It will be understood that the scale and deformation characteristics of the respective tolerance rings 140, 128 in FIGS. 11 and 12 have been exaggerated somewhat to more clearly demonstrate the differences therebetween.

As shown by the first curve 170 in FIG. 10, the prior art tolerance ring 140 provides a highly variable amount of installation force, culminating in two distinct force peaks at 172 and 174. With reference to FIG. 11, the first peak 172 occurs as an adjoining member 182 comes into contact with the tolerance ring 140 and passes over the first side extender 148. The tolerance ring 140 has a relatively higher resistance to compression at this point due to the stiffening effects provided by the first side extender 148 and the discontinuous transition 150. Since a tolerance ring is typically provided with a nominal outer diameter slightly larger than the corresponding bore of the adjoining member (182 in FIG. 11), the tolerance ring is necessarily deformed somewhat as the member is installed over the tolerance ring. As illustrated in FIGS. 10 and 11, once the member 182 passes over the first side extender 148 (peak 172 in FIG. 10), various portions of the raised portion 142 will be deformed. Such deformation can typically include a slight bowing in the first side extender 148 (as illustrated in FIG. 1), a "flattening" of the contact surface 146 (in a direction coming out of the page, so not illustrated in FIG. 11, but readily understood with a review of FIG. 6), and, in some cases, a slight flexing of the contact surface 146 and the second side extender (as illustrated in FIG. 11).

As the member 182 continues to traverse the tolerance ring 140, the insertion force will steadily increase (as represented by mid-portion 176 of the curve 170 in FIG. 10) until the leading edge of the member 182 reaches the second side extender 148, at which point the maximum amount of resistance is encountered due primarily to the stiffness of the second side extender 148 (as illustrated at the second peak 174 in FIG. 10). Continued movement of the leading edge of the member 182 past the second side extender 148 serves to place the tolerance ring 140 in a final, deformed (compressed) state, and this state may include a slight bowing of the second extender 148, as shown in FIG. 11. Once finally deformed, further movement of the member 182 past the tolerance ring 140 results in a substantially constant installation force (as exemplified by trailing portion 178 of curve 170 in FIG. 10).

It will be noted from the foregoing discussion that the two force peaks 172, 174 of the prior art installation force profile curve 170 arise primarily due to the relative stiffness of the tolerance ring 140 at the respective ends of each raised portion 142. This stiffness, in turn, primarily arises due to the nonuniform distribution of forces within the tolerance ring 140 induced by the relatively short, linear side extenders 148 and the discontinuous transitions 150 between the extenders 148 and the base portion 144.

By contrast, the low, consistent insertion force profile curve 180 of FIG. 10 results from a more uniform distribution of compressive forces within the tolerance ring 128 during installation. The elliptical contact surface 158 is more readily and consistently deformable in all directions, and the radiused transitions 160 allow "flattening" of the raised portion 142 (not unlike the "squeezing" of a balloon), as illustrated in the installation sequence of FIG. 12. Depending upon the application, this flattening can include the outward translation of the base portions 160 of the raised portions 154 (note the dotted reference lines in FIG. 12).

In view of the foregoing, it will now be understood that the present invention is directed to an apparatus which provides a low consistent installation force profile as a rotatable member is installed onto a stationary member extending along an axis.

In accordance with preferred embodiments, a tolerance ring 128 has a substantially cylindrical base portion 156 from which a plurality of spaced apart raised portions 154 radially extend. Each raised portion has a contact surface 158 with a substantially elliptical cross-section in a direction parallel to the axis and a pair of transition portions 160 between the contact surface and the base portion each having a continually radiused cross-section in a direction parallel to the axis so that, for each raised portion, a selected one of the elliptical cross-sections and the pair of radiused cross-sections is convex with respect to the axis and the remaining one of the elliptical cross-sections and the pair of radiused cross-sections is concave with respect to the axis.

For purposes of the appended claims, the "means for engaging and providing" will be clearly understood as corresponding to the structures of FIGS. 7–9 and explicitly excluding as nonequivalent structures the prior art structures of FIGS. 4–6.

It will be clear that the present invention is well adapted to attain the ends and advantages mentioned as well as those inherit within. While the presently preferred embodiment has been described for purposes of this disclosure, numerous changes may be made which will readily suggest themselves to those skilled in the art and which are encompassed in the spirit of the invention disclosed as well as defined in the appended claims.

What is claimed is:

1. A tolerance ring circumferentially extending about an axis for the insertion of a rotatable actuator assembly, having a central aperture defining an actuator axis, upon a stationary shaft through the central aperture of the actuator, in a disc drive, the tolerance ring comprising:

a substantially cylindrical base portion extending an axial length along the axis and a radial distance from the axis; and a plurality of spaced apart raised portions radially extending from the base portion each consisting of an arcuate contact surface with a substantially elliptical cross-section in a direction parallel to the axial length and a pair of arcuate transition portions between the contact surface and the base portion each having a continually radiused cross-section in a direction parallel to the axial length so that, for each raised portion, a selected one of the elliptical cross-sections and the pair of radiused cross-sections is convex with respect to the axis and remaining one of the elliptical cross-sections and the pair of radiused cross-sections is concave with respect to the axis wherein the tolerance ring provides a substantially constant and consistent insertion profile along an axial length of the actuator axis.

2. The tolerance ring of claim 1, wherein the plurality of spaced apart raised portions radially extend in a direction away from the axis.

3. The tolerance ring of claim 1, wherein the stationary shaft has an outer surface and the central aperture has an inner surface, whereby the tolerance ring compressingly engages the inner and outer surfaces to secure the actuator assembly about the shaft.

4. The tolerance ring of claim 1, wherein the actuator assembly further comprises:

a rigid actuator body having a central aperture with an inner surface; and a rotatable cartridge bearing assembly disposable within the central aperture and having an outer surface, wherein the tolerance ring is compressingly disposed between the inner and outer surfaces to secure the cartridge bearing assembly relative to the actuator body.

5. The tolerance ring of claim 1, wherein the tolerance ring comprises stainless steel.

6. The tolerance ring of claim 1, wherein the tolerance ring comprises polymeric material.

7. The tolerance ring of claim 1, wherein the tolerance ring comprises polyphenylsulfone.

8. A disc drive, comprising:

a basedeck;

a spindle motor supported on the basedeck;

a disc supported on the spindle motor for rotation about a disc axis;

a moveable actuator assembly which supports a head adjacent the disc, the actuator assembly having a central aperture with an inner surface defining an actuator axis;

a stationary shaft supported on the basedeck having an outer surface and which defines an actuator axis nominally parallel to the disc axis; and a tolerance ring compressingly disposed between the inner and outer surfaces to mount the actuator assembly for rotation about the shaft, comprising:

a substantially cylindrical base portion extending an axial length along the actuator axis and a radial distance from the actuator axis; and a plurality of spaced apart raised portions radially extending from the base portion each consisting of an arcuate contact surface with a substantially elliptical cross-section in a direction parallel to the axial length and a pair of arcuate transition portions between the contact surface and the base portion each having a continually radiused cross-section in a direction parallel to the axial length so that, for each raised portion, a selected one of the elliptical cross-sections and the pair of radiused cross-sections is convex with respect to the actuator axis and the remaining one of the elliptical cross-sections and the pair of radiused cross-sections is concave with respect to the actuator axis wherein the tolerance ring provides a substantially constant and consistent insertion profile along an axial length of the actuator axis.

9. The disc drive of claim 8, wherein the plurality of spaced apart raised portions of the tolerance ring radially extend in a direction away from the actuator axis.

10. The disc drive of claim 8, further comprising a second tolerance ring extending a second radial distance from the actuator axis, and wherein the actuator assembly further comprises:

a rigid actuator body having a body aperture with an inner body surface; and a rotatable cartridge bearing assembly disposed within the inner body surface and having an outer cartridge bearing assembly surface, wherein the second tolerance ring is compressingly disposed between the inner body surface and the outer cartridge bearing assembly surfaces to secure the cartridge bearing assembly relative to the actuator body.

11. The disc drive of claim 8, wherein the tolerance ring comprises stainless steel.

12. The disc drive of claim 8, wherein the tolerance ring comprises polymeric material.

13. The disc drive of claim 8, wherein the tolerance ring comprises polyphenylsulfone.

* * * * *